Nov. 11, 1930.          G. TAUSCHEK          1,781,349
PAWL
Filed July 13, 1928
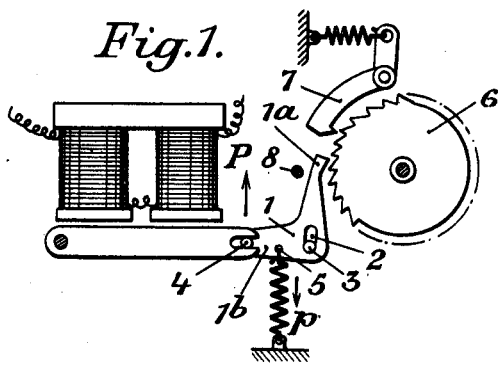
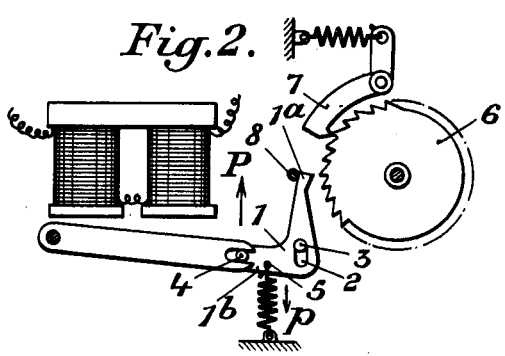
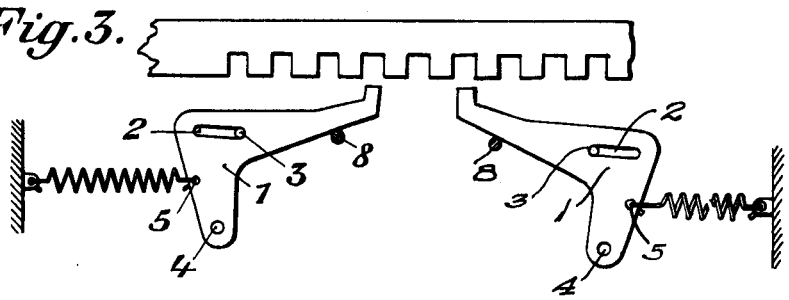
INVENTOR:
GUSTAV TAUSCHEK
BY
ATTORNEYS Patented Nov. 11, 1930

1,781,349

UNITED STATES PATENT OFFICE

GUSTAV TAUSCHEK, OF VIENNA, AUSTRIA

PAWL

Application filed July 13, 1928, Serial No. 292,425, and in Austria July 25, 1927.

The object of the invention is a pawl, which advantageously may always be used if the feed is effected by sudden and blow-like forces and in which the force effecting the feed is also positively used to prevent by means of the pawl over-throw of the ratchet wheel or the like. Such feeding operations occur mainly in electromagnetically controlled counting works, clocks, registering mechanisms, printing presses and the like. In machines of all kinds in which the feed is effected by compressed air or spring power more or less complicated means for preventing over-throw are also necessary, which simultaneously, however, comprise the necessity of adaptation of the moving power and the moved mass. The pawl according to the invention combines the advantage of greatest simplicity with the advantage that it is unnecessary to adapt the power to the mass.

In the accompanying drawing one mode of carrying out the invention is shown by way of example.

Fig. 1 shows the pawl in lifted position,

Fig. 2 illustrates the pawl in the dropped position, and

Fig. 3 shows a view of the tooth formation.

In Figs. 1 and 2 it is assumed that the pawl feeds under the action of an electromagnet and is returned into the original position by means of a spring. The directions of these forces are indicated by the arrows P and $p$.

The pawl 1 is formed as an angle lever which at its bent portion is provided with an elongated slot 2. A pin 3, forming a pivot, engages this slot. One arm $1^a$ of the angle lever 1 is formed as a tooth, while the other arm $1^b$ is acted upon by the forces P and $p$. The points 4 and 5 at which the forces P and $p$ act must be so arranged, that the point 5 is nearer the pivot 3 than the point 4.

The pawl operates as follows: The force P becomes effective and shifts the pawl 1 from the position shown in Fig. 2, in which it is held by the force $p$ of the spring, around the pivot 3 until the arm $1^a$ engages the ratchet wheel 6, rack or the like. Under the action of the force $p$ the pawl 1 is therefore rigidly coupled to the ratchet wheel 6. As now a further rotation of the pawl 1 is impossible, the force P, however, continues to act, the pawl 1 is shifted in the direction of the force P as far as is allowed by the slot 2 (Fig. 1) the length of which corresponds to the desired amount of feed.

The ratchet wheel 6 is then fixed in this position by a pawl 7. An overthrow of the ratchet wheel cannot occur, as during the whole movement, the ratchet wheel 6 and pawl 1 are rigidly coupled under the action of the force P. As soon after completion of the feeding movement as the force P ceases to act, the force $p$ of the spring rotates the pawl 1 about the pivot 3, until the arm $1^a$ abuts against a stop 8. Hereafter the pawl 1 is shifted backward in the direction of the slot 2, until it reaches the original position.

It will be seen from the above described operation of the pawl, the disengagement of which is not effected by the teeth of the ratchet wheel, that very different tooth formations may be used, and that therefore the new device is independent of the ratchet tooth formation, necessary hitherto, which independence makes it possible to turn a ratchet wheel or its equivalent in opposite directions by means of two pawls. Fig. 3 shows by way of example the tooth formation which may be used in connection with a pawl constructed according to the invention.

What I claim is:

1. In a feeding mechanism, a feed pawl formed as a pivoted angle lever which is shiftable relatively to its pivot for a distance corresponding to the feed movement, one arm of the angle lever transmitting its feed movement to the body which is to be fed, and means acting upon its other arm, for shifting and returning said pawl, the shifting and returning means being arranged in such a manner that the line in which the return force acts lies nearer to the pivot than the line in which the transmitting force acts.

2. In a feeding mechanism, a feed pawl formed as a pivoted angle lever which is shiftable relatively to its pivot for a distance corresponding to the feed movement, one arm of the angle lever transmitting its feed movement to the body which is to be fed, means acting upon its other arm, for shifting and returning said pawl, the shifting and returning means being arranged in such a manner that the line in which the return force acts lies nearer to the pivot than the line in which the transmitting force acts, and a fixed stop for limiting rotation of the angle lever on its return movement.

3. In a feeding mechanism, a feed pawl formed as an angle lever, having a slot in the bent portion thereof, the length and the direction of which slot correspond to the extent and the direction of the feed movement, a fixed pin which engages said slot and forms the pivot of the pawl, said pawl having a feed tooth on the one arm of the angle lever, a spring connected to the other arm of said angle lever, means for shifting said angle lever against the action of said spring, and a fixed stop for limiting rotation of said angle lever on its return movement.

4. In a feed pawl, an angle lever having one arm formed as a pawl and the other arm formed as an abutment at which the moving forces act, said angle lever being provided with an elongated slot in the bent portion thereof, a fixed pin forming the pivot of said angle lever engaging said slot, a spring connected to one arm of said angle lever, an electromagnet for moving said angle lever against the action of said spring and a fixed stop for limiting rotation of the said angle lever on its return movement.

In testimony whereof I have affixed my signature.

GUSTAV TAUSCHEK.